(12) United States Patent
Zhang

(10) Patent No.: US 9,959,040 B1
(45) Date of Patent: May 1, 2018

(54) INPUT ASSISTANCE FOR COMPUTING DEVICES

(71) Applicant: Google Inc., Mountain View, CA (US)

(72) Inventor: Eric Zhang, Jersey City, NJ (US)

(73) Assignee: Google LLC, Mountain View, CA (US)

(*) Notice: Subject to any disclaimer, the term of this patent is extended or adjusted under 35 U.S.C. 154(b) by 453 days.

(21) Appl. No.: 14/453,047

(22) Filed: Aug. 6, 2014

Related U.S. Application Data

(63) Continuation of application No. 13/749,462, filed on Jan. 24, 2013, now Pat. No. 8,826,178.

(60) Provisional application No. 61/723,180, filed on Nov. 6, 2012.

(51) Int. Cl.
G06F 3/0488 (2013.01)
G06F 3/0484 (2013.01)
G01C 9/02 (2006.01)

(52) U.S. Cl.
CPC .......... *G06F 3/04886* (2013.01); *G01C 9/02* (2013.01); *G06F 3/04842* (2013.01)

(58) Field of Classification Search
CPC .. G06F 3/048; G06F 3/04886; G06F 3/04842; G01C 9/02
See application file for complete search history.

(56) References Cited

U.S. PATENT DOCUMENTS

| | | | |
|---|---|---|---|
| 7,358,960 B2 | 4/2008 | Mak | |
| 2008/0168404 A1 | 7/2008 | Ording | |
| 2009/0070704 A1 | 3/2009 | Ording | |
| 2009/0259969 A1 | 10/2009 | Pallakoff | |
| 2009/0325607 A1 | 12/2009 | Conway et al. | |
| 2011/0059775 A1* | 3/2011 | Choi | G06F 1/1694 |
| | | | 455/566 |
| 2011/0316797 A1 | 12/2011 | Johansson | |
| 2012/0162261 A1* | 6/2012 | Kim | G06F 3/017 |
| | | | 345/647 |
| 2012/0293436 A1 | 11/2012 | Dolenc et al. | |
| 2013/0111384 A1 | 5/2013 | Kim et al. | |
| 2013/0111403 A1 | 5/2013 | Nakamura | |
| 2013/0120464 A1* | 5/2013 | Wei | G06F 3/04842 |
| | | | 345/672 |

* cited by examiner

*Primary Examiner* — Li Sun

(74) *Attorney, Agent, or Firm* — Shumaker & Sieffert, P.A.

(57) ABSTRACT

An example method includes designating a corner region of a display device as active, and outputting, for display at the display device, a user interface including at least one element positioned at a first location substantially diagonally opposite and at a first distance from the active corner region. The method further includes receiving an indication of a gesture interpreted by the computing device as originating within the active corner region and terminating within a center region of the display device, and responsive to receiving the indication of the gesture, outputting, for display at the display device, an updated user interface including the element positioned at a second location a second distance from the active corner region.

20 Claims, 8 Drawing Sheets

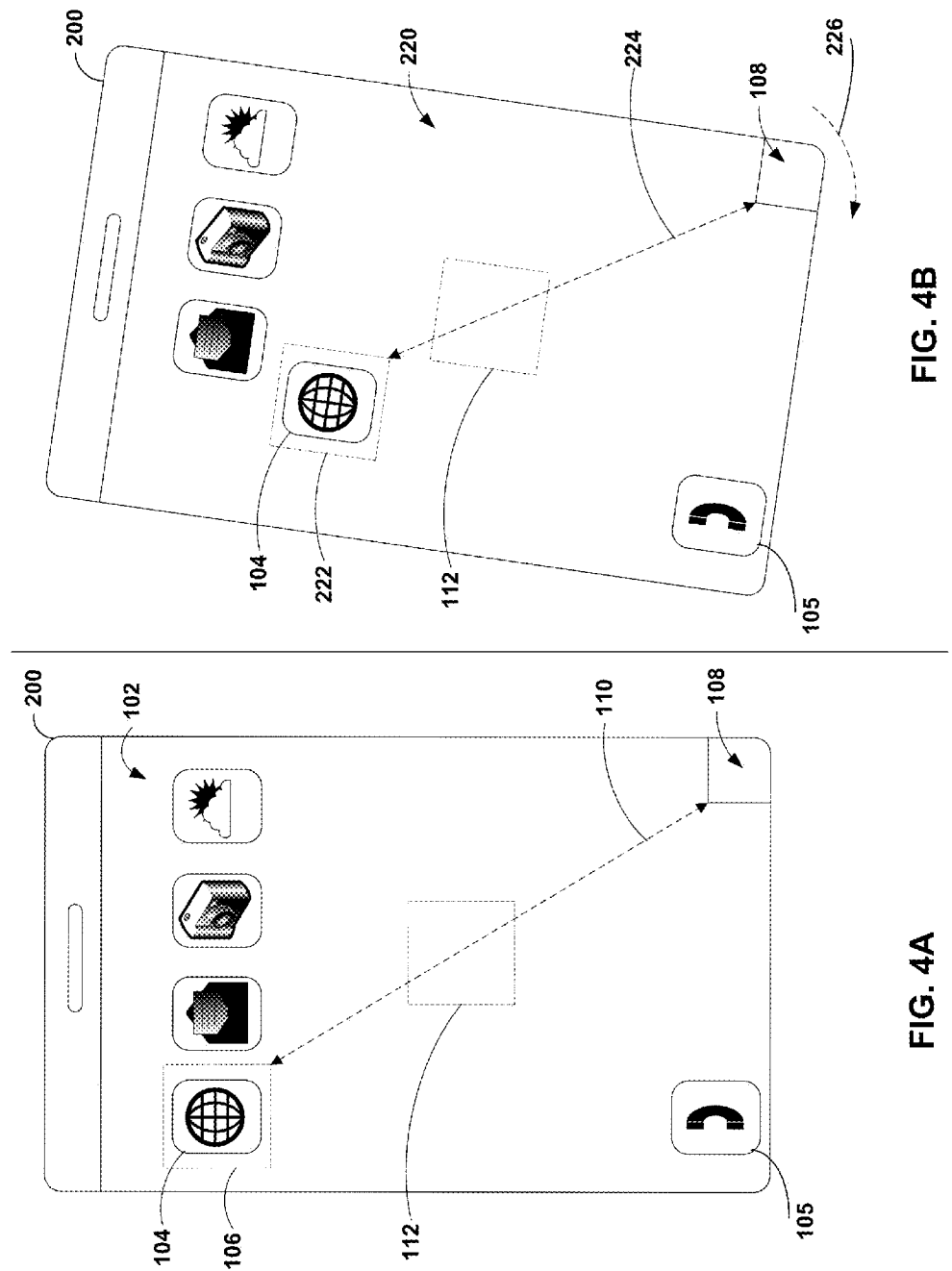

INPUT ASSISTANCE FOR COMPUTING DEVICES

CROSS-REFERENCE TO RELATED APPLICATIONS

This application is a continuation of application Ser. No. 13/749,462, filed on Jan. 24, 2013, which claims the benefit of U.S. Provisional Application No. 61/723,180, filed Nov. 6, 2012, the entire content of each of which is incorporated herein in its entirety.

BACKGROUND

Computing devices in general, and mobile computing devices in particular, may enable a user to interact with the device through touch-based input. For example, some mobile computing devices may include display devices that also accept touch input, such as presence-sensitive displays and touchscreens. Users may operate these computing devices in various ways. For example, a user may operate a mobile computing device, such as a smartphone, by cradling the smartphone in the user's palm, and provide touch input using the thumb of the same hand. As another example, when using a tablet computer, a user may hold the tablet computer by placing a corner or side of the tablet computer in each hand, and provide touch input using both thumbs.

SUMMARY

In one example, a method performed by a computing device includes designating a corner region of a display device operatively coupled to the computing device as an active corner region, and outputting, for display at the display device, a user interface including at least one element positioned at a first location substantially diagonally opposite and at a first distance from the active corner region. The method may further include receiving an indication of a gesture detected by the display device, the gesture interpreted by the computing device as originating within the active corner region and terminating within a center region of the display device, and responsive to receiving the indication of the gesture, outputting, for display at the display device, an updated user interface including the element positioned at a second location a second distance from the active corner region.

In another example, a method performed by a computing device includes designating a corner region of a display device operatively coupled to the computing device as an active corner region, and outputting, for display at the display device, a user interface including at least one element that is positioned at a first location substantially diagonally opposite and at a first distance from the active corner region. The method may further include detecting, using at least one tilt sensor operatively coupled to the computing device, a tilt condition that indicates a movement of the active corner region in either a clockwise direction or a counterclockwise direction, and responsive to detecting the tilt condition, outputting, for display at the display device, an updated user interface including the element positioned at a second location a second distance from the active corner region.

In another example, a computer-readable storage device is encoded with instructions. The instructions, when executed, cause one or more processors of a computing device to designate a corner region of a display device operatively coupled to the computing device as an active corner region, and output, for display at the display device, a user interface including at least one element that is positioned at a first location substantially diagonally opposite and at a first distance from the active corner region. The instructions may further cause the one or more programmable processors of the computing device to receive an indication of a gesture detected by the display device, the gesture interpreted by the one or more processors as originating within the active corner region and terminating at a center region of the display device, and responsive to receiving the indication of the gesture, output, for display at the display device, an updated user interface including the element positioned at a second location a second distance from the active corner region.

In another example, a computing system includes one or more programmable processors, a display device operatively coupled to the one or more programmable processors, and one or more tilt sensors. The programmable processor(s) are configured to designate a corner region of the display device as an active corner region, and output, for display at the display device, a user interface including at least one element that is positioned at a first location substantially diagonally opposite and at a first distance from the corner region. The programmable processor(s) may further be configured to detect, using at least one tilt sensor of the one or more tilt sensors, a tilt condition that indicates a movement of the active corner region in either a clockwise direction or a counterclockwise direction and, responsive to detecting the tilt condition, to output for display at the display device, an updated user interface including the element positioned a second location a second distance from the active corner region.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A & 4B are conceptual diagrams illustrating example user interfaces provided by a computing device that implements tilt sensor-based input assistance in accordance with one or more aspects of this disclosure.

DETAILED DESCRIPTION

Figure 1:
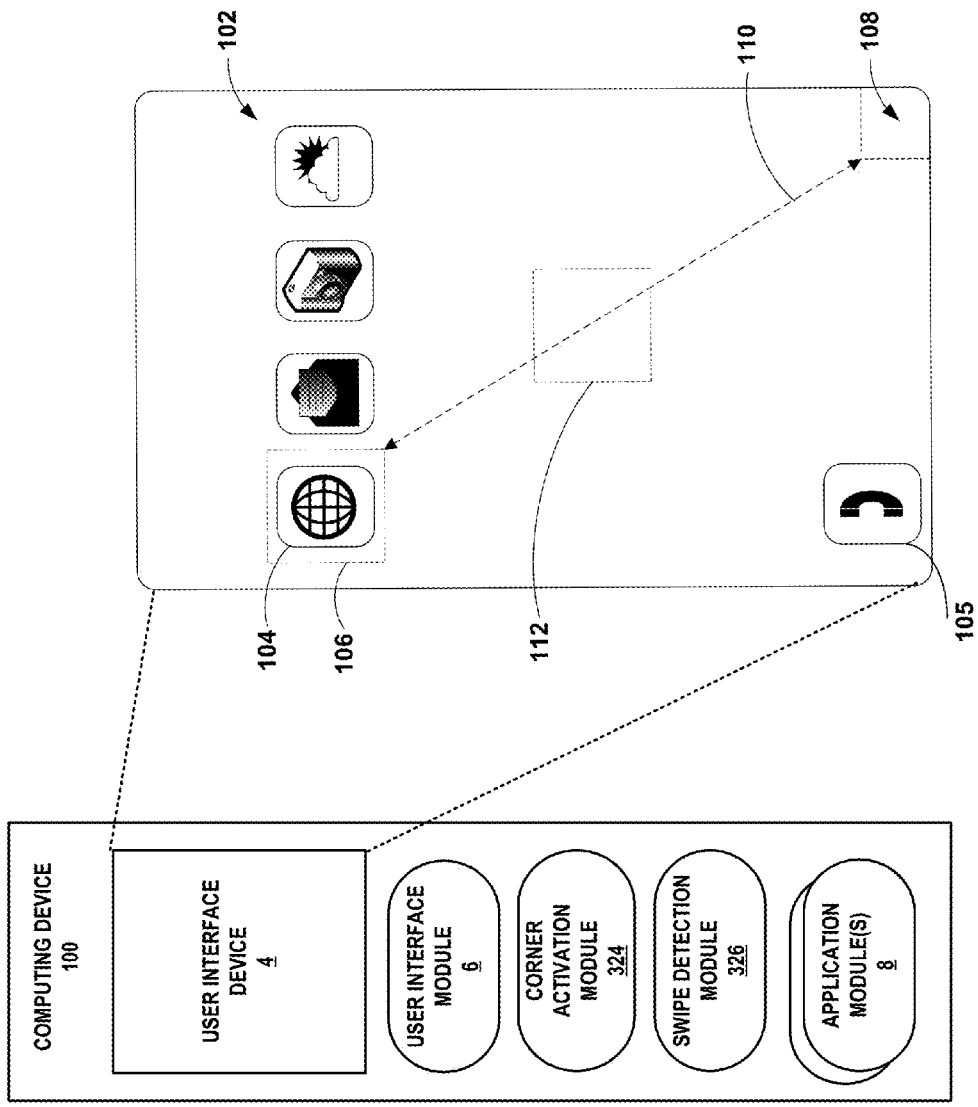
FIG. 1 is a conceptual diagram illustrating an example user interface provided by a computing device that implements swipe-based input assistance, in accordance with one or more aspects of this disclosure.

In general, techniques of this disclosure are directed to assisting user input on mobile computing devices. A mobile computing device may provide a user interface on a display device, such as a presence-sensitive screen (e.g., a touchscreen). Based on the size of the presence-sensitive screen, certain portions and/or elements of the user interface, such as certain icons, may be difficult for a user to access when providing input (such as presence-based input and/or touch input) from corners and/or sides of the mobile computing device. For example, a user may need to use two hands or change how he/she is holding the device in order to reach certain portions of the user interface.

Techniques of this disclosure may enable a user to more easily access portions of the user interface (UI) that are located beyond the immediate reach of, e.g., a thumb or other finger of the hand that holds the mobile computing device. In some aspects, techniques of this disclosure may enable a user to designate a corner region (or "activate" the corner region) of the presence-sensitive screen. For example, the techniques may enable the user to provide a swipe gesture originating from the active corner region towards a center region of the presence-sensitive screen. In response to receiving the swipe gesture, the mobile computing device may update the UI to provide the user with easier access to those portions of the UI that are not within the immediate reach of the thumb or other finger.

As another example, the techniques may enable a user to tilt the mobile computing device such that the active corner region rotates, e.g., in a clockwise or counterclockwise direction. The mobile computing device may be equipped with one or more tilt sensors, and may use the tilt sensors to detect a tilt condition associated with the active corner region. In response to the detected tilt condition, the mobile computing device may update the UI to provide the user with easier access to those portions of the UI that are not within the immediate reach of the thumb or other finger.

Techniques of this disclosure may provide one or more potential advantages. For example, a user may not need to use both hands to access the entirety of the UI, regardless of the size of the presence-sensitive screen. Instead, the user may activate one or more corner regions of the presence-sensitive screen, and then provide a swipe or other gesture (e.g., with the user's thumb) from the active corner region towards the center region of the presence-sensitive screen. The mobile computing device may then update the UI such that portions and/or elements of the UI that were initially inaccessible to the thumb are moved within reach of the thumb.

Similarly, the user may tilt the mobile computing device so that the active corner region moves in either a clockwise or counterclockwise direction. Responsive to the tilt condition, the mobile computing device may update the UI such that portions of the UI that were initially inaccessible when from the active corner region (or an area substantially including the active corner region), are moved within reach of a finger (e.g., a thumb) if the finger is located at or near the active corner region. In this manner, techniques of this disclosure may enable a user to access portions of the UI, even if the presence-sensitive screen is relatively large, without using a second hand, or without moving the second hand in scenarios where the user holds the mobile computing device with both hands.

FIG. 1 is a conceptual diagram illustrating an example user interface provided by a computing device that implements swipe-based input assistance, in accordance with one or more aspects of this disclosure. FIG. 1 illustrates computing device 100 that may provide graphical user interface (GUI) 102 for display. Computing device 100 may include, be, or be part of one or more of a variety of types of devices, including various mobile computing devices, such as a mobile phone (including a smartphone), tablet computer, netbook, laptop, personal digital assistant ("PDA"), or watch, among others. Additionally, computing device 100 may include or be otherwise coupled to user interface (UI) device 4. UI device 4 may include, be, or be part of a variety of devices, such as a presence-sensitive display, touchscreen, or any other input/output capable device. As shown in FIG. 1, computing device 100 may also include user interface (UI) module 6. UI module 6 may be configured or otherwise operable to provide, for display at UI device 4, graphical user interface (GUI) 102. GUI 102 may include several elements, including distal icon 104 and active corner region 108. While illustrated and described with respect to distal icon 104 for purposes of clarity, it will be appreciated that techniques of this disclosure may apply to other elements of GUI 102, such as interactive elements provided by one or more operating systems and/or applications running on computing device 100.

A user may designate a corner region (or "activate" the corner region) to form an active corner region, such as active corner region 108. Computing device 100 may implement the techniques of this disclosure to enable a user to activate a corner region in a number of ways. As shown, computing device 100 may include corner activation module 324. In some implementations, corner activation module 324 may receive an activation request via UI device 4. For instance, computing device 100 may receive a selection of an icon by way of a tap, press, or other interaction via UI device 4, or by way of a gesture or movement in the proximity of UI device 4, such as through a contactless gesture. In this and other examples, computing device 100 may receive the activation request through a hardware component, such as a button (not shown for ease of illustration purposes only). In such an example, computing device 100 may receive a press or other actuation of the button corresponding to the activation request.

In the example of FIG. 1, corner activation module 324 may designate, as active, a portion of GUI 102, such as active corner region 108. Corner activation module 324 may designate active corner region 108 in response to various stimuli, such as a user selection entered via various input devices of computing device 100. In other examples, corner activation module 324 may designate multiple active corner regions within GUI 102. In one such example, GUI 102 may include active corner region 108, as well as a second active corner region that includes the upper right corner of GUI 102. In this example, computing device 100 and/or components thereof may implement the techniques of this disclosure to assist a user in accessing both distal icon 104 and phone icon 105 positioned substantially near the lower left corner of GUI 102.

As shown in FIG. 1, GUI 102, as provided for display at UI device 4, includes center region 112 and distal icon 104 positioned at first location 106 within GUI 102 and distance 110 from active corner region 108. In various instances, computing device 100 and/or component(s) thereof may configure center region 112 based on various criteria, such as user preferences, the size and shape of computing device 100 and/or of UI device 4, the number and/or positions of icons within GUI 102, and others. Additionally, in some examples, computing device 100 may configure center region 112 to not include an exact center point of GUI 102, so long as computing device 100 determines that center region 112 is sufficiently proximate to the center point of GUI 102.

Computing device 100 may also include swipe detection module 326, and one or more application modules 8, as illustrated in FIG. 1. Swipe detection module 326 may be configured or otherwise operable to detect gestures, such as swipe gestures performed using a finger, stylus, etc. at or near UI device 4. For example, in an implementation where UI device 4 includes a presence-sensitive display, swipe detection module 326 may detect a swipe gesture based on a movement of a user's finger parallel to UI device 4, without making physical contact with UI device 4. As another example, in an implementation where UI device 4 includes a presence-sensitive screen, swipe detection module 326 may detect the swipe gesture based on a movement of a stylus or a user's finger while the stylus/finger is in direct physical contact with UI device 4. Aspects of swipe detection module 326 and application module(s) 8 are described in more detail below with reference to FIG. 2.

Figure 2:
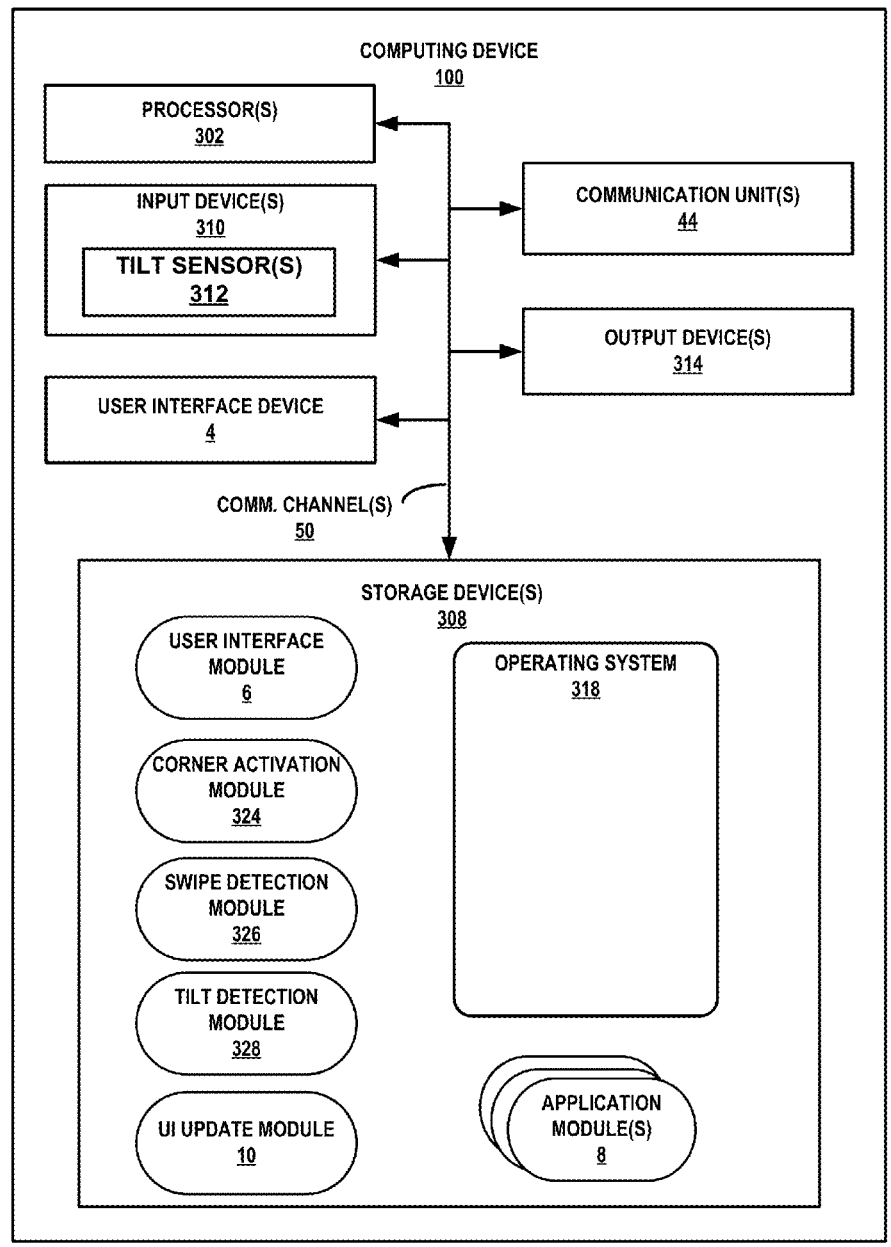
FIG. 2 is a block diagram illustrating details of an example computing device that may implement input assistance, in accordance with one or more aspects of this disclosure.

FIG. 2 is a block diagram illustrating details of an example computing device that may implement input assistance, in accordance with one or more aspects of this disclosure. Computing device 100 may be one non-limiting example of any device described in this disclosure, such as computing device 100 of FIG. 1. Commonly numbered elements of FIGS. 1 & 2 may operate similarly. As shown in the example of FIG. 2, computing device 100 includes one or more processors 302, memory 304, one or more network interfaces 306, one or more storage devices 308, one or more input devices 310, one or more output devices 314, and one or more power sources 316. In the example of FIG. 2, input devices 310 further include one or more tilt sensors 312. In other examples, tilt sensors 312 may be external to input devices 310. In still other examples, input devices 310 may include a subset of tilt sensors 312, while the remainder of tilt sensors 312 may be external to input devices 310.

One or more processors 302 are, in some examples, configured to implement functionality and/or process instructions for execution within computing device 100. For example, processors 302 may process instructions stored in memory 304 and/or instructions stored on storage devices 308. Such instructions may include components of operating system 318, control unit 322, corner activation module 324, swipe detection module 326, tilt detection module 328, user interface (UI) update module 330, and one or more application modules 8. Computing device 100 may also include one or more additional components not shown in FIG. 2, such as a global positioning system (GPS) receiver, and a radio frequency identification (RFID) reader, among others.

Computing device 100, in some examples, also includes one or more communication units 44. Computing device 100, in one example, utilizes communication unit(s) 44 to communicate with external devices via one or more networks, such as one or more wireless networks. Communication unit(s) 306 may include a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB. In some examples, computing device 100 utilizes communication unit(s) 44 to wirelessly communicate with external devices over a network.

One or more storage devices 308, in some examples, also include one or more computer-readable storage media and/or one or more computer-readable storage devices. In some examples, storage device(s) 308 may be configured to store greater amounts of information than a memory of computing device 100 (not shown for purposes of clarity only). Storage device(s) 308 may further be configured for long-term storage of information. In some examples, storage device(s) 308 include non-volatile storage elements. Examples of such non-volatile storage elements include magnetic hard discs, optical discs, solid-state discs, floppy discs, flash memories, forms of electrically programmable memories (EPROM) or electrically erasable and programmable memories, and other forms of non-volatile memories known in the art.

As shown in FIG. 2, computing device 100 may also include one or more input devices 310. One or more of input devices 310 may be configured to receive input from a user through tactile, audio, video, or biometric channels. Examples of input devices 310 may include a keyboard, mouse, touchscreen, presence-sensitive display, microphone, one or more still and/or video cameras, fingerprint reader, retina scanner, or any other device capable of detecting an input from a user or other source, and relaying the input to computing device 100, or components thereof. Output device(s) 314 of computing device 100, in some examples, may be configured to provide output to a user through visual, auditory, or tactile channels. Output device(s) 314 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. In various implementations, input device(s) 310 and/or output device(s) 314 may also include UI device 4, which, as described with respect to FIG. 1, may include a touchscreen, presence-sensitive display, or other input/output capable displays known in the art.

Operating system(s) 318 may control one or more functionalities of computing device 100 and/or components thereof. For example, operating system 318 may interact with application modules 8, and may facilitate one or more interactions between application modules 8 and one or more of processor(s) 302, storage device(s) 308, input device(s) 310, and output device(s) 314. As shown in FIG. 2, operating system 318 may interact with or be otherwise coupled to application modules 8 as well as other components of computing device 100 that are stored on storage device(s) 318. In some examples, one or more of corner activation module 324, swipe detection module 326, tilt detection module 328, and UI update module 330 may be included in (or otherwise provided by) operating system 318. In these and other examples, one or more of corner activation module 324, swipe detection module 326, tilt detection module 328, and UI update module 330 may be part of application modules 8. In some such instances, computing device 100 may use communication unit(s) 44 to access and implement functionalities illustrated as being provided by storage device(s) 308 and components thereof, through methods commonly known as "cloud computing."

In some examples, computing device 100 may also include a control unit. A control unit may, for purposes of this disclosure, include any combination of one or more processors, one or more field programmable gate arrays (FPGAs), one or more application specific integrated circuits (ASICs), and one or more application specific standard products (ASSPs). A control unit may also include memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to perform the efficient network management techniques described in this disclosure. Thus, a control unit may represent hardware or a combination of hardware and software to support the below described components, modules or elements, and the techniques should not be strictly limited to any particular embodiment described below.

Corner activation module 324 may designate one or more corner regions of UI device 4 as active (or "activate" the corner regions). In various implementations, corner activation module 324 may itself activate the corner regions of UI device 4, or cause operating system 318 and/or one or more of application modules 8 to activate the corner regions of UI device 4. Corner activation module 324 may activate a corner region of UI device 4 in response to receiving a user input that requests designating the corner region as active. In various examples, the user request may include a tap, press, or other interaction with a UI element output provided for display at UI device 4, actuation and/or push of a button or other hardware component of input devices 310, and others.

Swipe detection module 326 may be configured or otherwise operable to detect a swipe gesture input by a user via UI device 4. More specifically, swipe detection module 326 may implement the techniques of this disclosure to detect a swipe gesture that originates from an active corner region of the presence-sensitive screen towards a center region of the presence-sensitive screen. To detect such a swipe gesture, swipe detection module 326 may first detect an interaction (such as a contact with or proximate positioning of a finger or stylus) at the active corner region of UI device 4. In various instances, the interaction (e.g., user contact) may cover all or a portion of the active corner region. Additionally, the user contact may also cover portions of the UI device 4 that are external to the active corner region. In some examples, swipe detection module 326 may detect a swipe gesture performed within a certain proximity or vicinity of UI device 4, such as through a contactless gesture. In this manner, swipe detection module 326 may enable a user to enter a swipe gesture from the active corner region, while affording the user flexibility in accurate placement of a finger, stylus, etc. with respect to the location and dimensions of the active corner region.

Additionally, swipe detection module 326 may detect a swipe gesture that substantially includes a movement of a finger, stylus, etc. from the active corner region (i.e., a point of the initial user contact) towards the center region of UI device 4. In examples where UI device 4 includes a presence-sensitive screen, a swipe gesture may include a movement of the finger, stylus, etc. along the surface of the presence-sensitive screen, while maintaining physical contact with the presence-sensitive screen. Similarly, in examples where UI device 4 includes a presence-sensitive screen, the user contact and swipe may include placement and movement of a finger/stylus at a distance from the presence-sensitive screen that computing device 100 and/or components thereof determine to be sufficiently proximate to UI device 4 to indicate a user input.

As shown in FIG. 2, storage device(s) 308 may also include tilt detection module 328. Tilt detection module 328 may be configured or otherwise operable to detect one or more tilt conditions associated with computing device 100. Tilt detection module 328 may detect a tilt condition using tilt sensor(s) 312. Tilt sensor(s) 312 may detect clockwise and/or counterclockwise movements of the active corner region(s) designated by corner activation module 324. Based on the movements of the active corner region as discerned by tilt sensor(s) 312, tilt detection module 328 may determine that a user has tilted computing device 100 in a particular direction, thus requesting a particular type of user interface update.

Based on one or both of the swipe gesture and the tilt condition detected by swipe detection module 326 and tilt detection module 328 respectively, user interface (UI) update module 330 may generate an updated UI and cause one or more of output devices 314 to output the updated UI. UI update module 330 may update a previously output UI to make elements (e.g., icons, virtual buttons, etc.) more easily accessible to a user of computing device 100. More specifically, UI update module 330 may generate the updated UI such that elements that were previously distal from the active corner region are repositioned to be more proximal to the active corner region, within a UI provided for display at UI device 4. In this manner, UI update module 330 may, either alone in conjunction with other components of computing device 100, implement the techniques of this disclosure to assist users in interacting with computing device 100 through input.

Figure 3A:
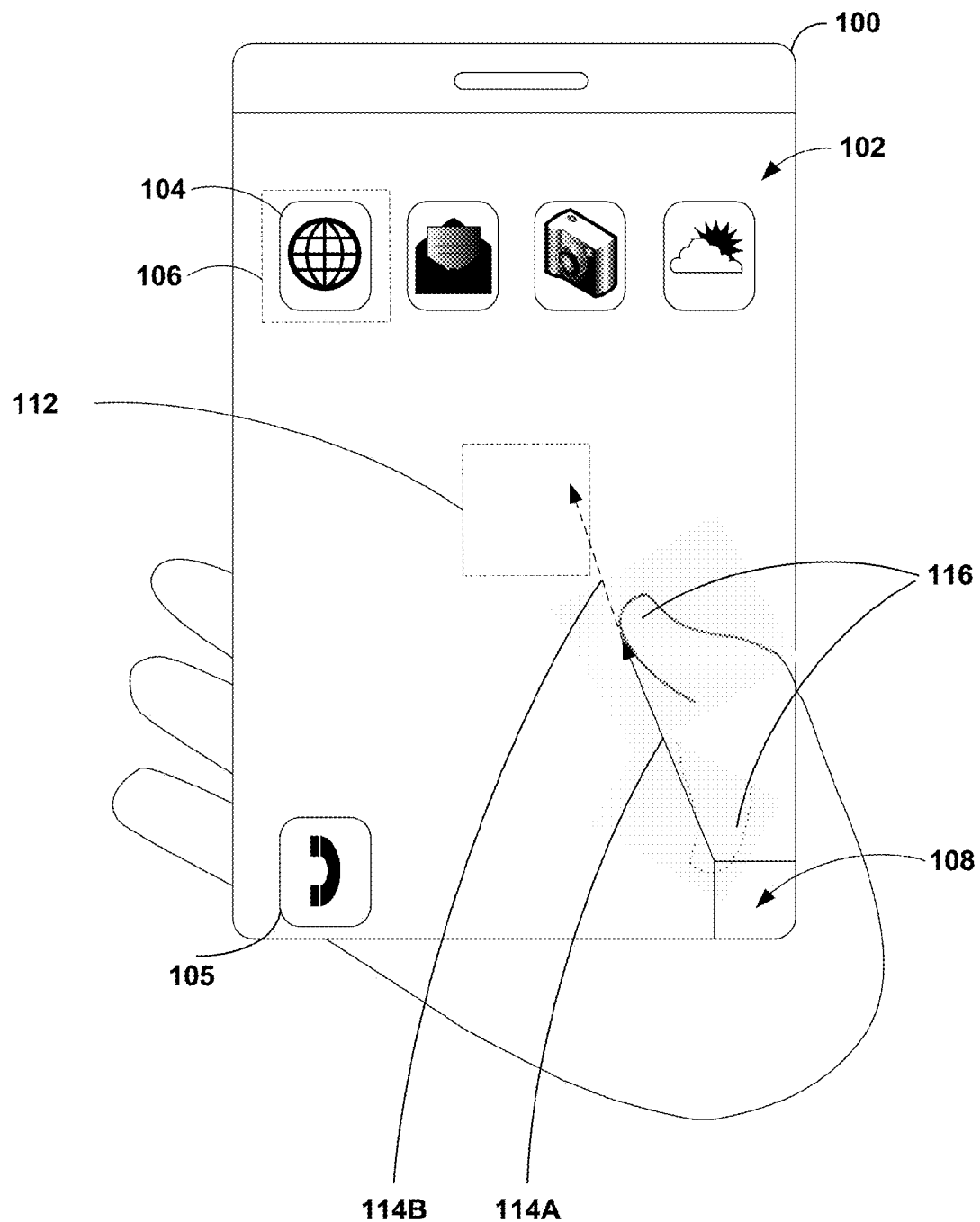
FIGS. 3A & 3B are conceptual diagrams illustrating example user interfaces provided by a computing device that implements swipe-based input assistance, in accordance with one or more aspects of this disclosure.
Figure 3B:
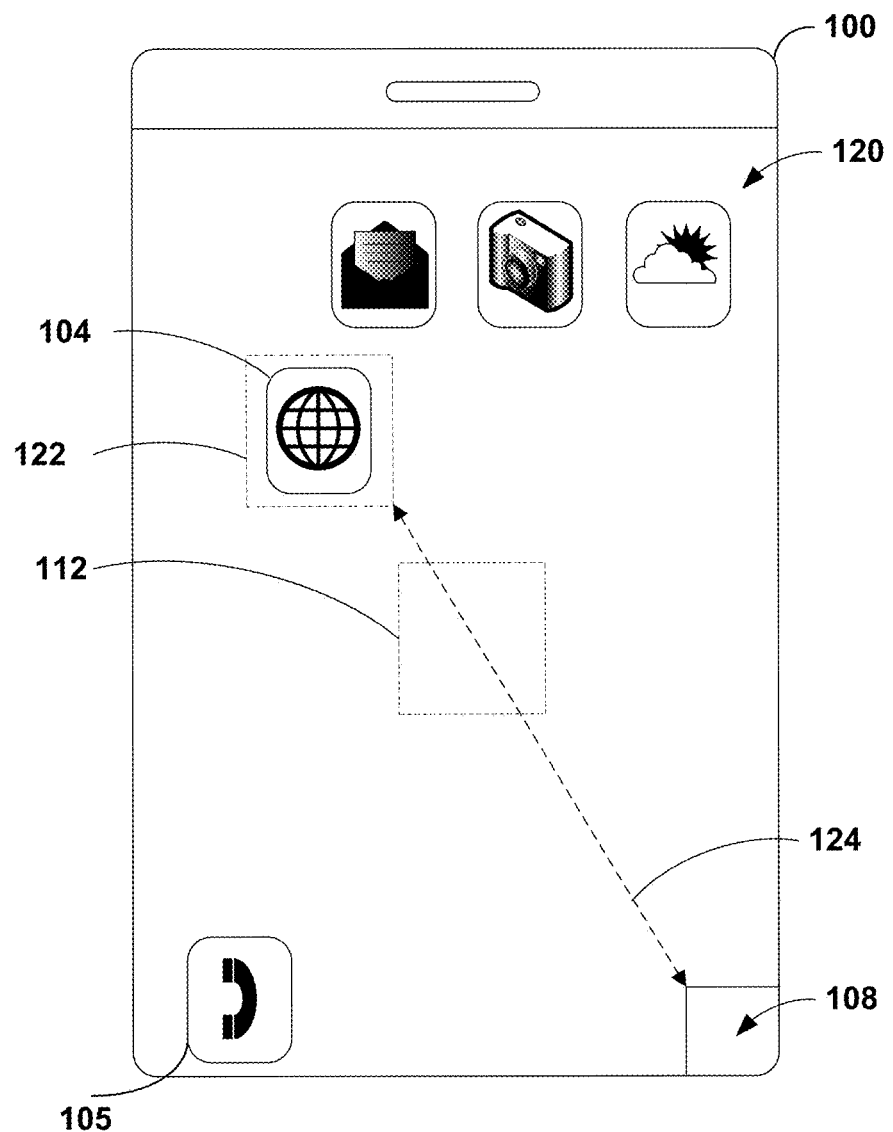

FIGS. 3A & 3B are conceptual diagrams illustrating example user interfaces provided by computing device 100 of FIGS. 1 and 2 that implements swipe-based input assistance, in accordance with one or more aspects of this disclosure. FIG. 3A illustrates computing device 100 receiving, via GUI 102, a swipe gesture 114 from active corner region 108 towards center region 112. In the example of FIG. 3A, a user may operate computing device 100 by cradling computing device 100 in the palm of the user's hand, and providing input through GUI 102 using thumb 116. Certain types of mobile computing devices, such as smartphones, may commonly be used in this single-hand fashion. Some such mobile computing devices may include presence-sensitive screens (e.g., touchscreens) that are relatively large, and a user may not be able to reach all GUI elements while operating the device in single-hand fashion. FIG. 3A illustrates such a scenario, i.e., distal icon 104 is out of reach of thumb 116 even when then user extends thumb 116.

Computing device 100 may implement techniques of this disclosure to assist the user in reaching distal icon 104 (among other elements) while the user operates computing device 100 in single-hand fashion. As described with respect to FIG. 1, the user may cause computing device 100 to designate active corner region 108. Computing device 100 may then receive swipe gesture 114 from the user. As illustrated in FIG. 3A, swipe gesture 114 may begin at active corner region 108, and be in a direction towards center region 114.

Swipe gesture 114 may begin when computing device 100 detects a user contact at active corner region 108. More specifically, computing device 100 may detect a contact of thumb 116 at active corner region (shown using a dashed-line illustration thumb 116, to indicate a past event). In the specific example of FIG. 3A, the user contact may encompass a portion of active corner region 108 as well as areas of GUI 102 that lie outside of active corner region 108 as shown by the original position of thumb 116. In other examples, the user contact may cover a portion of active corner region 108, but not any area of GUI 102 that lies outside of active corner region 108. Explained in the context of FIG. 3A, the original position of thumb 116 may cover a portion of active corner region, but not cover area of GUI 102 that lies outside of active corner region 108. In this manner, techniques of this disclosure may enable computing device 100 to swipe gesture 114 from a variety of origination positions, so long as the origination position includes a portion of active corner region 108.

Computing device 100 may then detect swipe gesture 114. As shown in FIG. 3A, swipe gesture 114 may include a movement of thumb 116 from active corner region 108 towards center region 112. More specifically, swipe gesture 114 may include a movement of thumb 116 from the initial position to the final position (shown by a solid-line illustration of thumb 116), while thumb 116 remains in contact with the presence-sensitive screen of computing device 100. FIG. 3A illustrates swipe gesture 114 in two portions, namely, a lower solid-line portion 114A and an upper dashed-line continuation 114B. Lower solid-line portion 114A indicates the actual distance covered by thumb 116 when providing swipe gesture 114. Dashed-line continuation 114B indicates the direction of swipe gesture 114. As shown by dashed-line continuation 114B, swipe gesture 114 includes movement of thumb 116 in a direction towards center region 112.

FIG. 3B illustrates computing device 100 outputting updated GUI 120, responsive to receiving swipe gesture 114 of FIG. 3A. In the implementation illustrated in FIG. 3B, computing device 100 may reposition distal icon 104 to make distal icon 104 more accessible to a user who operates computing device 100 in single-hand fashion (as described with respect to FIG. 3A). As shown, computing device 100 may reposition distal icon 104 to second location 122. Second location 122 may be at second distance 124 from active corner region 108. Though not drawn to scale, FIG. 3B shows second distance 124 to be less than first distance 110 illustrated in FIG. 1. In the specific example of FIG. 3B, second location 122 is positioned more distant from active corner region 108 than center region 112. In other examples, second location 122 may overlap with center region 112 (either partially or fully), be equally far from active corner region 108 as center region 112 (with or without overlap with center region 112), or be more proximate to active corner region 108 than center region 112 is. Computing device 100 may configure second distance 122 based on various criteria, such as the dimensions of the UI device (e.g., a presence-sensitive screen) of computing device 100, user preferences, and others.

Though described above with respect to repositioning a single icon (viz., distal icon 104), computing device 100 may implement the techniques of this disclosure to assist access to portions of GUI 102 in a variety of ways. In one such implementation, computing device 100 may, in response to receiving swipe gesture 114, pan GUI 102 towards active corner region 108. In other words, computing device 100 may reposition the entirety of distal icon 104 at second location 122. In addition, computing device 100 may reposition the remaining icons of GUI 102 to be more proximate to active corner region 108. In this manner, computing device 100 may implement the techniques of this disclosure to assist a user to more easily access not only distal icon 104, but other elements of GUI 102 as well.

In another implementation, computing device 100 may, in response to receiving swipe gesture 114, enlarge distal icon 104 and/or other elements of GUI 102 when generating updated GUI 120. By enlarging distal icon 104, computing device 100 may cause portions (e.g., the bottom right corner) of distal icon 104 to be more proximate to active corner region 108 in updated GUI 120. In some examples, computing device 100 may also enlarge other icons/elements of GUI 102 when generating updated GUI 120. In some such examples, computing device 100 may also diminish the size of icons/elements of GUI 102 that are proximate to active corner region 108, thus compensating for the enlarged icons/elements described.

Additionally, computing device 100 may also implement the techniques of this disclosure during execution of one or more applications, processes, and while outputting interfaces other than those illustrated in FIGS. 1 and 3A-3B. As an example, computing device 100 may, in response to a user request, execute a social networking application. During execution, the social networking application may cause computing device 100 to output an application interface. In examples, the application interface may cover the entirety of GUI 102. Additionally, the application interface may include one or more interactive elements, such as a text entry element for status updates, a button that a user may select to refresh information presented on the application interface, and others. Computing device 100 may enable a user to operate these interactive elements through in various ways, such as by providing input through the presence-sensitive screen. Computing device 100 may receive a swipe gesture (substantially similar to swipe gesture 114) from activated corner region 108 towards center region 112, and update the application interface to make one or more distal interactive elements more accessible to the user. Computing device 100 may make the distal interactive element(s) more accessible using one or more of the operations described above, such as panning the application interface, enlarging one or more interactive elements, moving one or more of the interactive elements, and others.

FIGS. 4A-4B are conceptual diagrams illustrating example user interfaces provided by a computing device that implements tilt sensor-based input assistance in accordance with one or more aspects of this disclosure. Computing device 200 may include elements similar to computing device 100, describe above, and may be any type of computing device capable of implementing techniques of this disclosure. In one example, computing device 200 is equipped with one or more hardware components known in the art as "tilt sensors." Tilt sensors may enable computing device 200 to discern a change of position along a reference plane. In examples, the reference plane may substantially conform to a surface of computing device 200, such as the surface of a display, or the surface of a back cover of computing device 200. The reference plane may include two axes including, for example, a horizontal axis that substantially conforms to the width of computing device 200 and a vertical axis that substantially conforms to the height of computing device 200.

FIG. 4A illustrates computing device 200 in a tilt-free state. In one example, the tilt-free state may indicate that the width-edge of computing device 200 is positioned substantially parallel to the earth's ground plane. In some implementations, computing device 199 may discern its position with respect to the earth's ground plane using an accelerometer. In these implementations, the accelerometer may include, be, be part of, or be coupled to the tilt sensor(s). While computing device 200 is in tilt-free state, distal icon 104 may be positioned at first location 106, as illustrated in FIG. 4A. In some implementations, computing device 200 may define a baseline (e.g., position relative to the ground plane or other reference object), and use the defined baseline for future tilt-based determinations. For instance, placing computing device 200 in tilt-free state according to the baseline may cause computing device 200 to be viewed at an angle (or skew) from certain vantage points. However, in such an instance, computing device 200 may use the baseline orientation (regardless of angle/skew) as the tilt-free state.

After designation of active corner region 108 (e.g., in response to receiving an activation request from a user), computing device 200 may detect a tilt condition, such as tilt condition 226 illustrated in FIG. 4B. In examples, the tilt condition may indicate a user input requesting assistance in accessing elements of GUI 102 (e.g., distal icon 104). In accordance with one or more aspects of this disclosure, computing device 200 may determine tilt condition 226 with respect to active corner region 108. For example, computing device 200 may configure the tilt sensor(s) and/or accelerometer to determine the position of one or more portions of active corner region 108 with respect to the earth's ground plane.

In the specific example of FIG. 4B, tilt condition 226 is in a clockwise direction. In several instances, a clockwise tilt may be associated with a user who operates computing device 200 in single-hand fashion using his/her right hand. When operating computing device 200 with user's the right hand, user interface (UI) elements displayed at or near the left vertical edge of computing device 200 may be relatively difficult to access using the right thumb. Conversely, a user who operates computing device 200 with the user's left hand may find it relatively difficult to access elements of GUI 102 that are displayed at or near the right vertical edge of computing device 200 with the left thumb.

To assist users in accessing such elements of GUI 102, computing device 200 may implement techniques of this disclosure to enable a user to tilt computing device 200 in order to generate updated GUI 220. In response to detecting the tilt (e.g., tilt condition 226), computing device 200 may implement techniques of this disclosure to generate updated GUI 220. As shown in FIG. 4B, updated GUI 220 includes distal icon 104 positioned at a new location, namely, at second location 222. Additionally, though not drawn to scale, second location 222 is shown to be more proximate to active corner region 108 than first location 106 is to active corner region 108. In another scenario, computing device 200 may detect a tilt condition indicating movement of active corner region in a counterclockwise direction. In this scenario, computing device 200 may generate updated GUI 220 such that phone icon 105 is repositioned to be more proximate to center region 112 and/or the upper right corner of GUI 102.

Conversely, a user who operates computing device 200 in single-hand fashion with the user's left hand may activate the lower left and/or upper left corner regions of the presence-sensitive screen to avail of one or more advantages provided by the techniques of this disclosure. In these scenarios, computing device 200 may detect tilt conditions (clockwise or counterclockwise) with respect to the activated corner(s), and generate updated GUI 220 such that elements at or near the right vertical edge of computing device 200 are more easily accessible from the activated corner(s). In this manner, computing device 200 may implement the techniques of this disclosure to assist users in accessing UI elements in varying scenarios, based on various criteria.

Figure 5:
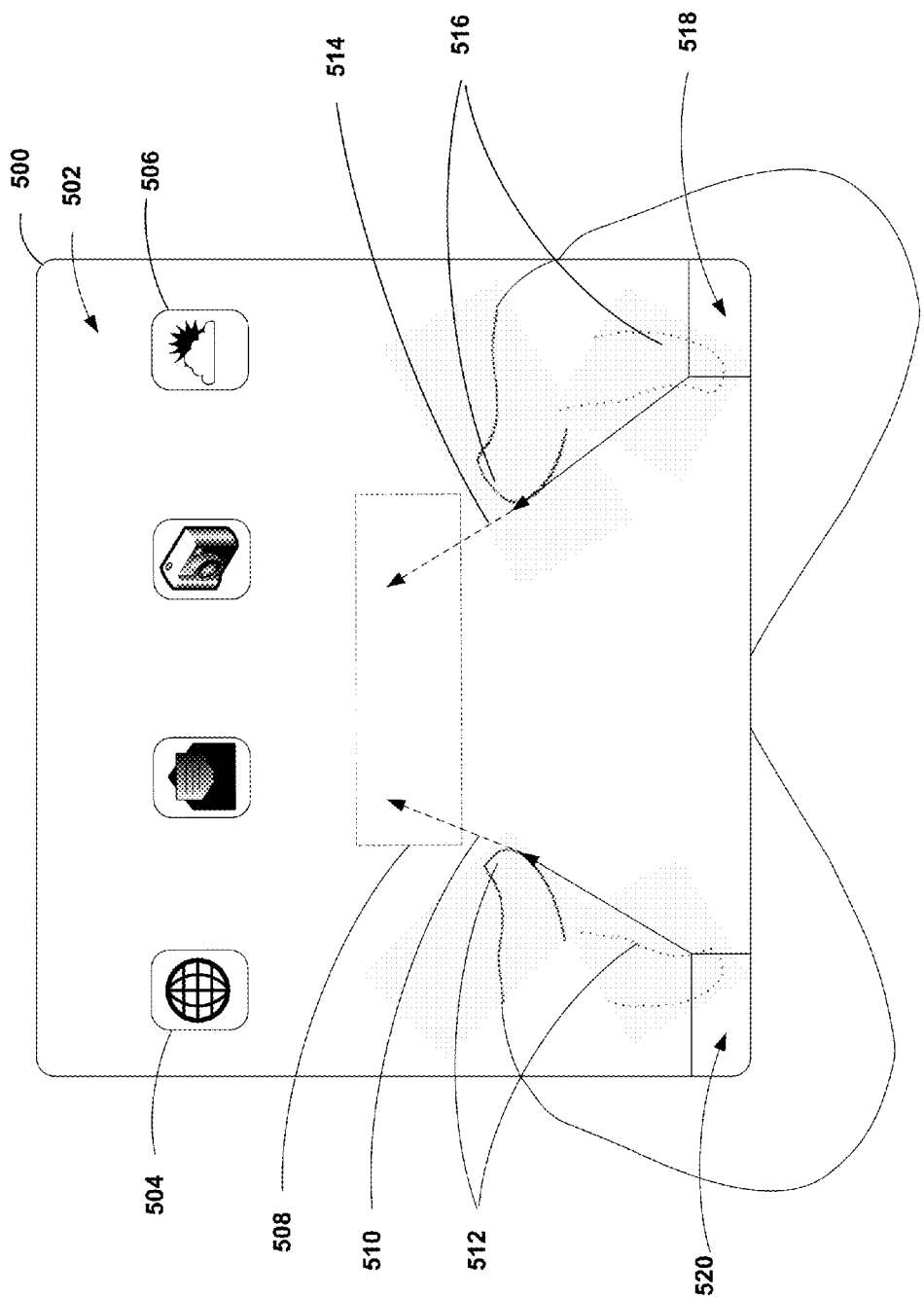
FIG. 5 is a conceptual diagram illustrating an example computing device that implements swipe swipe-based input assistance, in accordance with one or more aspects of this disclosure.

FIG. 5 is a conceptual diagram illustrating an example computing device that implements swipe-based input assistance, in accordance with one or more aspects of this disclosure. FIG. 5 illustrates additional scenarios in which techniques of this disclosure may be applied to assist a user to more easily access elements included in a user interface (UI) that is output by a computing device. Aspects described with respect to FIG. 5 may be of assistance in several scenarios, particularly those involving tablet computers, smartphones with relatively larger displays, smartphone-tablet hybrid devices, and PDAs. For ease of discussion purposes only, computing device 500 of FIG. 5 may be presumed to be a tablet computer.

As shown in FIG. 5, computing device 500 (and/or a display device thereof) may output GUI 502. In turn, GUI 502 may include several elements, such as left icon 504 and right icon 506. As with the mobile computing devices illustrated in FIGS. 1 & 2, computing device 500 may allocate center region 508 of GUI 502. In various implementations, center region 508 may include or be substantially near the exact center point of GUI 502 and/or the display device of computing device 500. Additionally, computing device may include two active corner regions, namely, active left corner 520 and active right corner 518. As discussed, computing device 500 may designate active left corner 520 and active right corner 518 based on various criteria and/or in response to various stimuli, such as user input.

Certain users may operate computing device 500 in a two-thumb fashion, as is the case with many tablet computers. More specifically, such users may hold computing device 500 by resting computing device 500 in the palms of both hands, and provide input using both thumbs (e.g., left thumb 512 and right thumb 516). Computing device 500 may, in response to receiving left swipe gesture 510, update GUI 502 so that right distal icon 506 is positioned more proximate to left active corner 520. Similarly, in response to receiving right swipe gesture 514, computing device 500 may update GUI 502 such that left distal icon 504 is positioned more proximate to right active corner 518. Thus, FIG. 5 illustrates an example in which techniques of this disclosure may assist input by providing multiple active corner regions. More specifically, FIG. 5 illustrates the applicability of the techniques to two-hand operation scenarios.

Additionally, FIG. 5 illustrates a scenario in which techniques of this disclosure may be applied to utilize multiple swipe gestures. For example, swipe gesture 514 alone may not cause computing device 500 to reposition left distal icon 504 by enough distance to make left distal icon accessible to right thumb 516. In other words, the second location of left distal icon 104 is at a second distance from right active corner 518; however, the second distance may not be sufficiently proximate to right active corner 518. To assist the user in this situation, computing device 500 may receive a second swipe gesture and, in response to the second swipe gesture, reposition left distal icon 504 to a third location, which may be at a third distance form right active corner 518. In this example, the third distance may be less than both the second distance and the first distance. In this manner, computing device 500 may receive multiple swipe gestures to generate multiple updated GUIs, and thus progressively reposition GUI elements until the user is able to access the elements during single-hand or two-thumb operation.

In some implementations, computing device 500 may recognize multiple swipe gestures for input assistance while computing device 500 operates in certain operating modes. For example, computing device 500 may select a multi-swipe mode from a plurality of available operating modes (e.g., in response to a user request to select the multi-swipe mode). While operating in the multi-swipe mode, computing device 500 may update GUI 502 multiple times in response to multiple swipe gestures from one or both of left active corner 520 and right active corner 518, to assist a user in accessing one or both of right distal icon 506 and left distal icon 504, respectively. In contrast, while operating in a single-swipe mode, computing device 500 only update GUI 502 once in response to left swipe gesture 510 and/or right swipe gesture 514. In this and other examples, computing device 500 may also optionally operate in a mode that does not recognize left swipe gesture 510 and/or right swipe gesture 514 in terms of providing input assistance. In this manner, computing device 500 may implement techniques of this disclosure to respond differently to differing numbers of swipe gestures, based on a plurality of operating modes provided by computing device 500.

Figure 6:
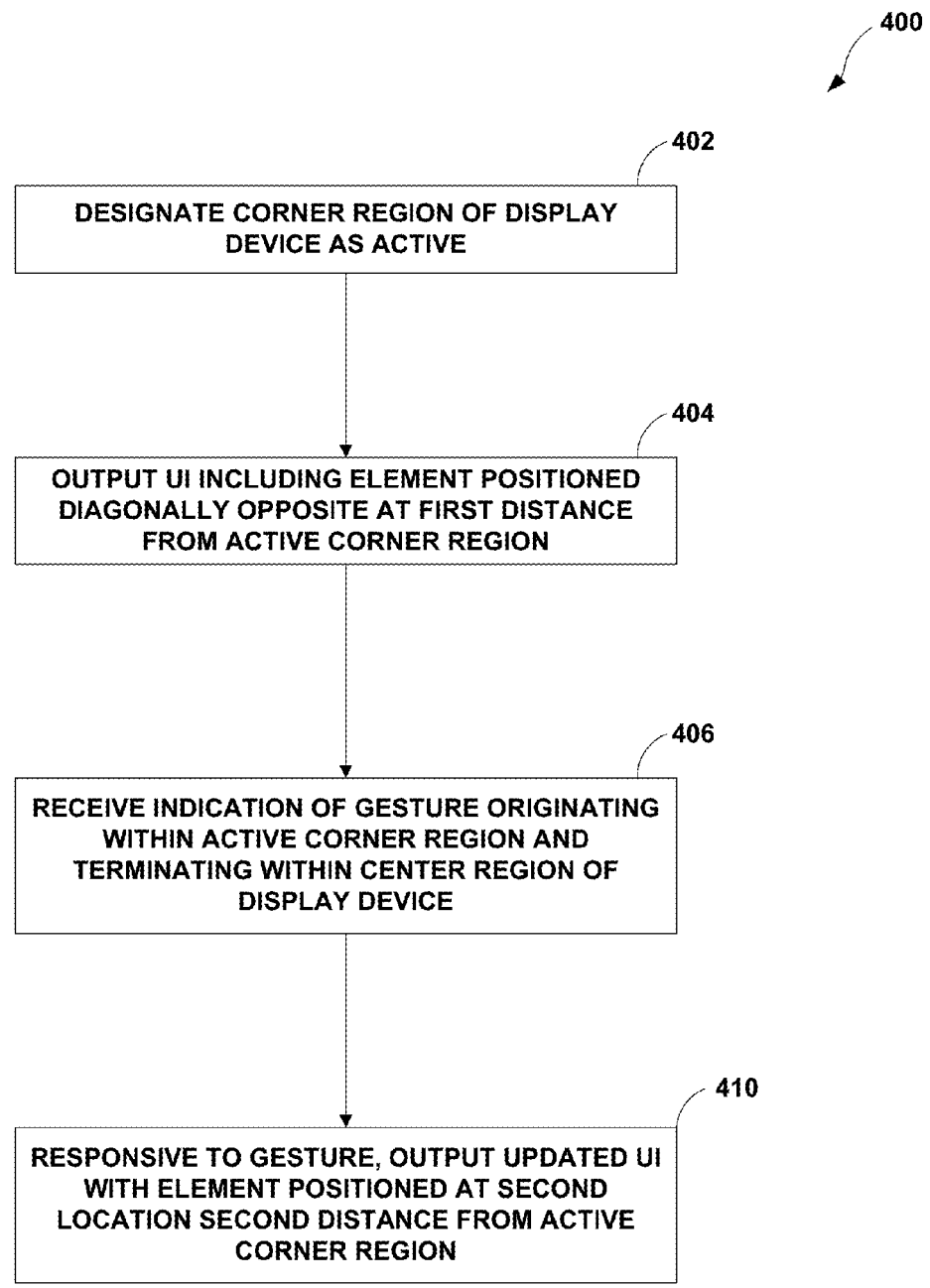
FIG. 6 is a flowchart illustrating an example process that a computing device may implement to provide input assistance, in accordance with one or more aspects of this disclosure.

FIG. 6 is a flowchart illustrating an example process 400 that a computing device may implement to provide input assistance, in accordance with one or more aspects of this disclosure. Although process 400 may be performed by any device described herein, process 400 will be described with respect to computing device 100 for ease of discussion only.

Computing device 100 may designate as active, a corner region of a display device (402). Designation of a corner region as active may also be referred to herein as "activating" the corner region. Corner activation module 324 may activate a corner region based on various stimuli, including the receipt of user input via channels such as presence-based input detected by UI device 4 or through hardware button actuation. Additionally, UI module 6 may output, for display at UI device 4, a user interface (UI) that includes an element positioned diagonally opposite (or substantially diagonally opposite) from, and at a first distance from, active corner region 108 (404). As discussed, UI module 6 may output the UI using various types of display devices (that may include, be, or be part of UI device 4), including input/output capable displays such as touchscreens and presence-sensitive displays.

Swipe detection module 326 may receive an indication of a gesture (e.g., detected by UI device 4) originating within active corner region 108 and terminating within center region 112 (406). The gesture may include movement of a finger, stylus, etc. while the input object remains within a predetermined proximity of UI device 4. In an example wherein UI device 4 includes a touchscreen, a swipe gesture may include a movement from the point of the initial user contact (e.g., active corner region 108) along the touchscreen, while maintaining contact with the touchscreen using the input object. In the example of other presence-sensitive screens, the swipe gesture may include a movement from the point of the initial user contact (e.g., active corner region 108) along the presence-sensitive screen, while remaining within a threshold proximity of the presence-sensitive screen using a finger, stylus, etc.

Responsive to detecting swipe gesture 114, UI module 6 may output, for display at UI device 4, an updated UI including distal icon 104 positioned at second location 122, a second distance 124 from active corner region 108 (410). As described with respect to FIGS. 1-3B, second distance 124 may be less than first distance 110. In other words, UI module 6 may, responsive to receiving swipe gesture 114, reposition distal icon 104 such that distal icon 104 is more proximate to active corner region 108. In this manner, computing device 100 and/or components thereof may implement process 400 to enable a user to more easily access UI elements, such as distal icon 104 and others.

Figure 7:
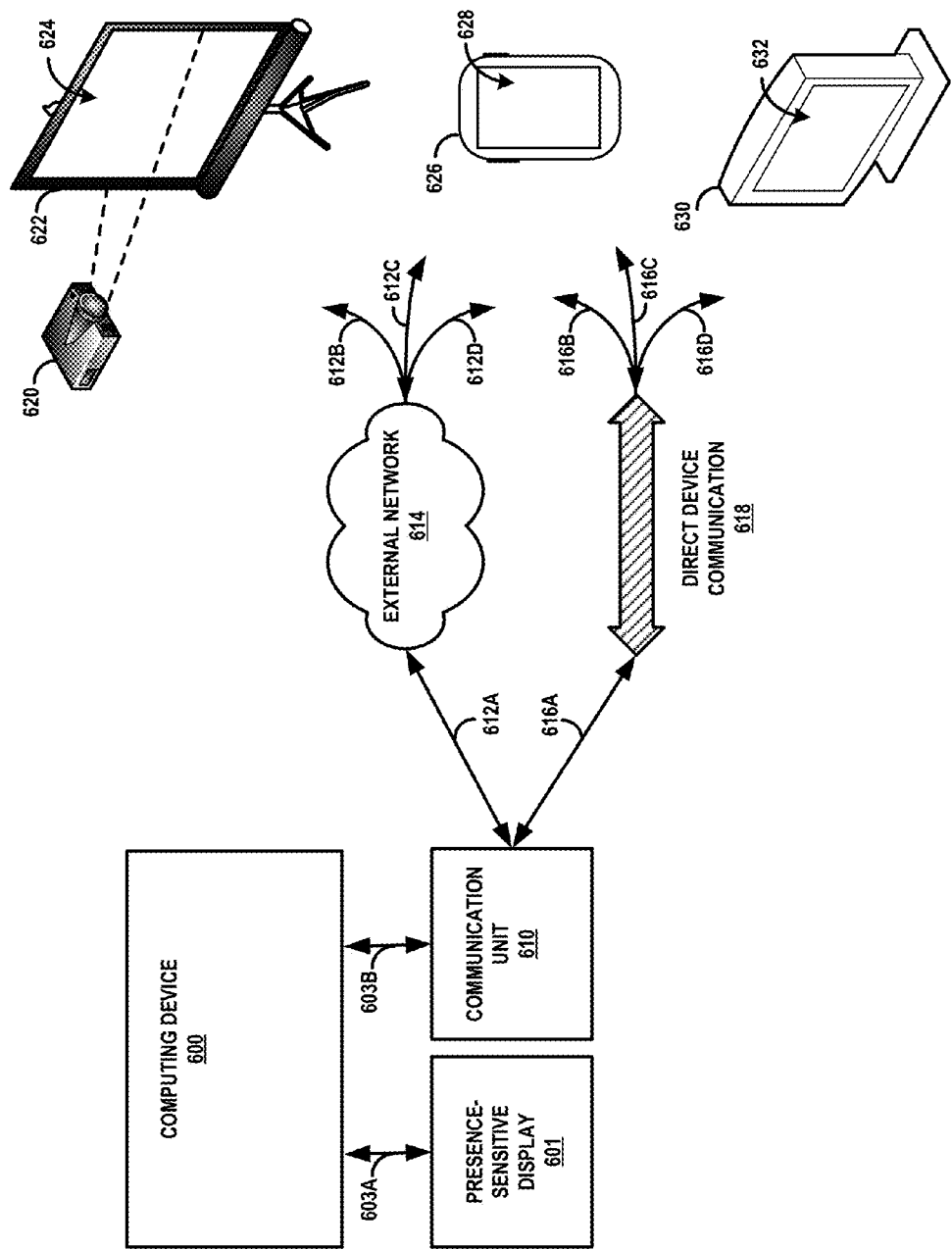
FIG. 7 is a block diagram illustrating an example computing device that outputs graphical content for display at a remote device, in accordance with one or more techniques of the present disclosure.

FIG. 7 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 7 includes a computing device 600, presence-sensitive display 601, communication unit 610, projector 620, projector screen 622, tablet device 626, and visual display device 632. Although shown for purposes of example in FIGS. 1-5 as a stand-alone computing device 600, a computing-device may, generally, be any component or system that includes a processor or other suitable computing environment for executing software instructions and, for example, need not include a presence-sensitive display.

As shown in the example of FIG. 7, computing device 600 may be a processor that includes functionality as described with respect to processor(s) 302 in FIG. 2. In such examples, computing device 600 may be operatively coupled to presence-sensitive display 601 by a communication channel 603A, which may be a system bus or other suitable connection. Computing device 600 may also be operatively coupled to I/O devices 610, further described below, by a communication channel 603B, which may also be a system bus or other suitable connection. Although shown separately as an example in FIG. 7, computing device 600 may be operatively coupled to presence-sensitive display 601 and I/O devices 610 by any number of one or more communication channels.

In other examples, such as illustrated previously in FIGS. 1-5, computing device 600 may be a portable or mobile device such as mobile phones (including smart phones), laptop computers, etc. In some examples, computing device 600 may be a desktop computers, tablet computers, smart television platforms, cameras, personal digital assistants (PDAs), servers, mainframes, etc.

As shown in FIG. 7, computing device 600 may also include and/or be operatively coupled with communication unit 610. Communication unit 610 may include functionality of communication unit 44 as described in FIG. 2. Examples of communication unit 610 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 600 may also include and/or be operatively coupled with one or more other devices, e.g., input devices, output devices, memory, storage devices, etc. that are not shown in FIG. 7 for purposes of brevity and illustration.

FIG. 7 also illustrates a projector 620 and projector screen 622. Other such examples of projection devices may include electronic whiteboards, holographic display devices, and any other suitable devices for displaying graphical content. Projector 620 and project screen 622 may include one or more communication units that enable the respective devices to communicate with computing device 600. In some examples, the one or more communication units may enable communication between projector 620 and projector screen 622. Projector 620 may receive data from computing device 600 that includes graphical content. Projector 620, in response to receiving the data, may project the graphical content onto projector screen 622. In some examples, projector 620 may determine one or more user inputs (e.g., continuous gestures, multi-touch gestures, single-touch gestures, etc.) at projector screen using optical recognition or other suitable techniques and send indications of such user input using one or more communication units to computing device 600.

Projector screen 622, in some examples, may include a presence-sensitive display 624. Presence-sensitive display 624 may include a subset of functionality or all of the functionality of UI device 4 as described in this disclosure. In some examples, presence-sensitive display 624 may include additional functionality. Projector screen 622 (e.g., an electronic whiteboard), may receive data from computing device 600 and display the graphical content. In some examples, presence-sensitive display 624 may determine one or more user inputs (e.g., continuous gestures, multi-touch gestures, single-touch gestures, etc.) at projector screen 622 using capacitive, inductive, and/or optical recognition techniques and send indications of such user input using one or more communication units to computing device 600.

FIG. 7 also illustrates tablet device 626 and visual display device 632. Tablet device 626 and visual display device 632 may each include computing and connectivity capabilities. Examples of tablet device 626 may include e-reader devices, convertible notebook devices, hybrid slate devices, etc. Examples of visual display device 632 may include televisions, computer monitors, etc. As shown in FIG. 5, tablet device 626 may include a presence-sensitive display 628. Visual display device 632 may include a presence-sensitive display 132. Presence-sensitive displays 628, 132 may include a subset of functionality or all of the functionality of UI device 4 as described in this disclosure. In some examples, presence-sensitive displays 628, 132 may include additional functionality. In any case, presence-sensitive display 132, for example, may receive data from computing device 600 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 600.

As described above, in some examples, computing device 600 may output graphical content for display at presence-sensitive display 601 that is coupled to computing device 600 by a system bus or other suitable communication channel. Computing device 600 may also output graphical content for display at one or more remote devices, such as projector 620, projector screen 622, tablet device 626, and visual display device 632. For instance, computing device 600 may execute one or more instructions to generate and/or modify graphical content in accordance with techniques of the present disclosure. Computing device 600 may output the data that includes the graphical content to a communication unit of computing device 600, such as communication unit 610. Communication unit 610 may send the data to one or more of the remote devices, such as projector 620, projector screen 622, tablet device 626, and/or visual display device 632. In this way, processor(s) 302 may output the graphical content for display at one or more of the remote devices. In some examples, one or more of the remote devices may output the graphical content at a presence-sensitive display that is included in and/or operatively coupled to the respective remote devices.

In some examples, computing device 600 may not output graphical content at presence-sensitive display 601 that is operatively coupled to computing device 600. In other examples, computing device 600 may output graphical content for display at both a presence-sensitive display 601 that is coupled to computing device 600 by communication channel 603A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 600 and output for display at presence-sensitive display 601 may be different than graphical content display output for display at one or more remote devices.

Computing device 600 may send and receive data using any suitable communication techniques. For example, computing device 600 may be operatively coupled to external network 614 using network link 612A. Each of the remote devices illustrated in FIG. 7 may be operatively coupled to network external network 614 by one of respective network links 612B, 612C, and 612D. External network 614 may include network hubs, network switches, network routers, etc., that are operatively inter-coupled thereby providing for the exchange of information between computing device 600 and the remote devices illustrated in FIG. 7. In some examples, network links 612A-612D may be Ethernet, ATM or other network connections. Such connections may be wireless and/or wired connections.

In some examples, computing device 600 may be operatively coupled to one or more of the remote devices included in FIG. 7 using direct device communication 618. Direct device communication 618 may include communications through which computing device 600 sends and receives data directly with a remote device, using wired or wireless communication. That is, in some examples of direct device communication 618, data sent by computing device 600 may not be forwarded by one or more additional devices before being received at the remote device, and vice-versa. Examples of direct device communication 618 may include Bluetooth, Near-Field Communication, Universal Serial Bus, WiFi, infrared, etc. One or more of the remote devices illustrated in FIG. 7 may be operatively coupled with computing device 600 by communication links 616A-616D. In some examples, communication links 612A-612D may be connections using Bluetooth, Near-Field Communication, Universal Serial Bus, infrared, etc. Such connections may be wireless and/or wired connections.

In accordance with techniques of the disclosure, computing device 600 may be operatively coupled to visual display device 632 using external network 614. Computing device 600 may designate a corner region of visual display device 632 as an active corner region, and output a user interface for display at visual display device 632, the user interface including at least one element positioned at a first location substantially diagonally opposite and at a first distance from the active corner region. For instance, computing device 600 may send data that includes a representation of the user interface to communication unit 610. Communication unit 610 may send the data that includes the representation of the user interface to visual display device 632 using external network 614. In examples, visual display device 632, in response to receiving the data using external network 614, may cause visual display device 632 to output the user interface. In response to a user performing a gesture at presence-sensitive display 132 to provide an indication of input, visual display device 632 may send an indication of the gesture to computing device 600 using external network 614. Communication unit 610 of may receive the indication of the gesture, and send the indication to computing device 600.

Computing device 600 may receive an indication of a gesture detected by visual display device 632, the gesture interpreted by computing device 600 as originating within the active corner region of visual display device 632 and terminating within a center region of visual display device 632. In some examples, computing device 600 may responsive to receiving the indication of the gesture, output for display at visual display device 632, an updated user interface including the element positioned at a second location a second distance from the active corner region of visual display device 632. In this manner, processor(s) 302 may provide user input assistance, in accordance with one or more techniques of the disclosure.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
designating, by a computing device, a corner region of a display device as an active corner region;
outputting, by the computing device and for display at the display device, a user interface including at least one element positioned at a first location diagonally opposite and at a first distance from the corner region;
detecting, by at least one tilt sensor of the computing device, a first movement of the active corner region in either a clockwise direction or a counterclockwise direction;
determining, by the computing device, that the detected movement of the active corner region indicates a first tilt condition;
responsive to detecting the first tilt condition, outputting, by the computing device and for display at the display device, a first updated user interface including the element positioned at a second location between the active corner region and the first location and at a second distance from the active corner region, the second distance being less than the first distance;
selecting, by the computing device, a multi-tilt mode from a plurality of operating modes of the computing device;
while the computing device is operating in the multi-tilt mode, detecting, by the computing device, a second tilt condition that indicates a second movement of the active corner region in either the clockwise direction or the counterclockwise direction; and
responsive to detecting the second tilt condition, outputting, by the computing device and for display at the display device, a second updated user interface including the element positioned at a third location a third distance from the active corner region.

2. The method of claim 1, wherein outputting the first updated user interface comprises visually panning the user interface such that the element visually moves from the first position to the second location at the second distance from the active corner region.

3. The method of claim 1, wherein outputting the first updated user interface comprises outputting the element at the second position at a display size that is larger than a display size of the element when the element was displayed at the first location.

4. The method of claim 1, wherein designating the corner region as the active corner region is at least partly in response to receiving an indication of user input to designate the corner region as the active corner region.

5. The method of claim 1,
wherein the second tilt condition indicates movement of the active corner region in a same direction as a direction of the first tilt condition, and
wherein the third distance is less than the second distance.

6. The method of claim 1,
wherein the second tilt condition indicates movement of the active corner region in an opposite direction as a direction of the first tilt condition, and
wherein the third distance is greater than the second distance.

7. The method of claim 1,
wherein the user interface comprises an application user interface of an application executing at the computing device, and
wherein the element comprises an interactive element of the application user interface.

8. The method of claim 1, wherein the element comprises an icon included in the user interface.

9. A computing system comprising:
one or more programmable processors;
a display device operatively coupled to the one or more programmable processors; and
one or more tilt sensors,
wherein the one or more programmable processors are configured to:
  designate a corner region of the display device as an active corner region;
  output, for display at the display device, a user interface including at least one element positioned at a first location diagonally opposite and at a first distance from the corner region;
  determine that that a first movement of the active corner region in either a clockwise direction or a counterclockwise direction, detected by the one or more tilt sensors, indicates a first tilt condition;
  responsive to detecting the first tilt condition, output, for display at the display device, a first updated user interface including the element is positioned at a second location between the active corner region and the first location and at a second distance from the active corner region, the second distance being less than the first distance;
  select a multi-tilt mode from a plurality of operating modes of the computing system; and
  while the computing system is operating in a multi-tilt mode and responsive to the one or more tilt sensors detecting a second movement of the active corner region in either the clockwise direction or the counterclockwise direction indicative of a second tilt condition, output, for display at the display device, a second updated user interface including the element positioned at a third location a third distance from the active corner region.

10. The computing system of claim 9, wherein the one or more programmable processors are configured to output the first updated user interface by at least being configured to visually pan the user interface such that the element visually moves from the first position to the second location at the second distance from the active corner region.

11. The computing system of claim 9, wherein the one or more programmable processors are configured to output the first updated user interface by at least being configured to output the element at the second position at a display size that is larger than a display size of the element with respect to the user interface when the element was displayed at the first location.

12. The computing system of claim 9, wherein the one or more programmable processors are configured to designate the corner region as active at least partly in response to an indication of user input received by the one or more programmable processors, wherein the received user input requests a designation of the corner region as active.

13. The computing system of claim 9,
wherein the second tilt condition indicates movement of the active corner region in a same direction as a direction of the first tilt condition, and
wherein the third distance is less than the second distance.

14. The computing system of claim 9,
wherein the second tilt condition indicates movement of the active corner region in an opposite direction as a direction of the first tilt condition, and
wherein the third distance is greater than the second distance.

15. The computing system of claim 9,
wherein the user interface comprises an application user interface of an application executing at the computing device, and
wherein the element comprises an interactive element of the application user interface.

16. A non-transitory computer-readable storage device encoded with instructions that, when executed, cause one or more processors of a computing device to:
  designate a corner region of a display device as an active corner region;
  output, for display at the display device, a user interface including at least one element positioned at a first location diagonally opposite and at a first distance from the corner region;
  detect, using at least one tilt sensor of the computing device a movement of the active corner region in either a clockwise direction or a counterclockwise direction;
  determine that the detected movement of the active corner region indicates a first tilt condition;
  responsive to the detection of the first tilt condition, output, for display at the display device, a first updated user interface including the element positioned at a second location between the active corner region and the first location and at a second distance from the active corner region, the second distance being less than the first distance;
  select a multi-tilt mode from a plurality of operating modes of the computing device;
  while the computing device is operating in the multi-tilt mode, detect a second tilt condition that indicates a second movement of the active corner region in either the clockwise direction or the counterclockwise direction; and
  responsive to detecting the second tilt condition, output, for display at the display device, a second updated user interface including the element positioned at a third location a third distance from the active corner region.

17. The non-transitory computer-readable storage device of claim 16, wherein the instructions to output the first updated user interface comprise instructions to visually pan the user interface such that the element visually moves from the first position to the second location at the second distance from the active corner region.

18. The non-transitory computer-readable storage device of claim 16, wherein the instructions to output the first updated user interface comprise instructions to output the element at the second position at a display size that is larger than a display size of the element when the element was displayed at the first location.

19. The non-transitory computer-readable storage device of claim 16,
wherein the second tilt condition indicates movement of the active corner region in a same direction as a direction of the first tilt condition, and
wherein the third distance is less than the second distance.

20. The non-transitory computer-readable storage device of claim 16,
wherein the second tilt condition indicates movement of the active corner region in an opposite direction as a direction of the first tilt condition, and
wherein the third distance is greater than the second distance.

* * * * *